United States Patent [19]
Flora

[11] Patent Number: 5,666,507
[45] Date of Patent: Sep. 9, 1997

[54] PIPELINED MICROINSTRUCTION APPARATUS AND METHODS WITH BRANCH PREDICTION AND SPECULATIVE STATE CHANGING

[75] Inventor: Laurence P. Flora, Valley Center, Calif.

[73] Assignee: Unisys Corporation, Blue Bell, Pa.

[21] Appl. No.: 578,783

[22] Filed: Dec. 26, 1995

Related U.S. Application Data

[63] Continuation of Ser. No. 174,858, Dec. 29, 1993, abandoned.

[51] Int. Cl.⁶ ............................................. G06F 9/38
[52] U.S. Cl. ............................. 395/394; 395/569
[58] Field of Search ............................ 395/394, 569, 395/800

[56] References Cited

U.S. PATENT DOCUMENTS

| | | | |
|---|---|---|---|
| 4,901,233 | 2/1990 | Liptay | 395/394 |
| 4,992,934 | 2/1991 | Portanova et al. | 395/375 |
| 5,136,696 | 8/1992 | Beckwith et al. | 395/375 |
| 5,222,244 | 6/1993 | Carbine et al. | 395/375 |
| 5,241,636 | 8/1993 | Kohn | 395/375 |
| 5,293,613 | 3/1994 | Hayden et al. | 395/575 |
| 5,367,705 | 11/1994 | Sites et al. | 395/800 |

OTHER PUBLICATIONS

Smith et al., "Implementing Precise Interrupts in Pipelined Processors", *IEEE Transactions on Computers*, vol. 37, No. 5, May 1988, pp. 562–573.
MC88100 RISC Microprocessor User's Manual, Section 1, 1988.
MC88110 Second Generation DISC User's Manual, Sections 9,3,4,3–9,3,4,5,4.

*Primary Examiner*—William M. Treat
*Attorney, Agent, or Firm*—Nathan Cass; Mark T. Starr

[57] ABSTRACT

High speed instruction execution apparatus is disclosed which provides multistage pipelining and branch prediction in a manner which permits speculative changes of state to be made during execution of a predicted instruction before the correctness of the prediction has been determined.

7 Claims, 7 Drawing Sheets

FIG. 4

| CLOCK PERIOD | 1 | 2 | 3 | 4 | --- |
|---|---|---|---|---|---|
| MICROINSTUCTION ADDRESS $A_m$ | $A_m1$ | $A_m2$ | $A_m3$ | --- | --- |
| MICROINSTUCTION M | --- | M1 | M2 | M3 | --- |

FIG. 5

| CLOCK PERIOD | 1 | 2 | 3 | 4 | 5 | 6 | 7 | 8 | 9 | 10 |
|---|---|---|---|---|---|---|---|---|---|---|
| MICROINSTUCTIONS | M1 | M2 | M3 | M4 | M5 | M6 | M7 | M8 | M9 | M10 |

MCISC-1, MCISC-2
MRISC-1, MRISC-2, MRISC-3

| CLOCK PERIOD | 1 | 2 | 3 | 4 | 5 | 6 | 7 | 8 | 9 | 10 |
|---|---|---|---|---|---|---|---|---|---|---|
| STAGE 0 | A1 | B1 | C1 | D1 | E1 | B2 | F1 | G1 | G2 | G3 |
| STAGE 1 |  | A1 | B1 | C1 | D1 | X | B2 | F1 | G1 | G2 |
| STAGE 2 |  |  | A1 | B1 | C1 | X | X | B2 | F1 | G1 |
| STAGE 3 |  |  |  | A1 | B1 | X | X | X | B2 | F1 |

| COLCK PERIOD | 1 | 2 | 3 | 4 | 5 | 6 | 7 |
|---|---|---|---|---|---|---|---|
| EX-1 | A | B | C1 | D | E | F | G |
| EX-2 | ? | A | B | X | D | E | F |
| EX-3 | ? | ? | A | X | X | D | E |
| COUNTER 303 | 1 | 2 | 3 | 1 | 1 | 2 | 3 |
| RESTORE REG 305 | ? | 1 | 2 | X | X | 1 | 2 |
| RESTORE REG 307 | ? | ? | 1 | X | X | 1 | 1 |

5,666,507

PIPELINED MICROINSTRUCTION APPARATUS AND METHODS WITH BRANCH PREDICTION AND SPECULATIVE STATE CHANGING

This application is a continuation of patent application Ser. No. 08/174,858, filed Dec. 29, 1993 now abandoned.

RELATED U.S. APPLICATIONS

This application contains subject matter related to the following commonly assigned patent applications.

ON-CHIP MULTI-CACHE PROCESSING SYSTEM, Ser. No. 08/159,883, filed Nov. 30, 1993, now U.S. Pat. No. 5,574,883, MICROCODE CACHE SUBSYSTEM, Ser. No. 08/159,683, filed Nov. 30, 1993, now abandoned.

HIGH SPEED MICROINSTRUCTION APPARATUS AND METHODS EMPLOYING CISC AND RISC INSTRUCTIONS WITH MULTISTAGE PIPELINING AND BRANCH PREDICTION, Ser. No. 08/174,856, filed concurrently herewith, now abandoned.

BACKGROUND AND SUMMARY OF THE INVENTION

The present invention relates generally to improved apparatus and methods for controlling the operation of digital data processors.

In the above mentioned concurrently filed application Ser. No. 08/174,856, a highly advantageous high speed microinstruction execution architecture is disclosed which is preferably implemented on a single integrated circuit chip or module and which is capable of employing CISC and RISC instructions with multistage pipelining and branch prediction. The present invention provides a very significant and novel enhancement of the approach disclosed in this application which is likewise preferably implemented on a single integrated circuit chip or module and which is also applicable to a wide variety of other architectures.

The novel enhancement provided by the present invention adds the very important capability of permitting speculative changes of state to occur during execution of a predicted instruction before it is determined whether or not the instruction was correctly predicted. As is well known by those skilled in the art, permitting changes of state for a possibly incorrect instruction is considered to be undesirable, because of the problems associated with having to undo the incorrect state changes, which is an even more difficult problem where a multistage architecture is employed, as in the aforementioned concurrently filed patent application.

In accordance with the present invention, methods and apparatus are provided which permit speculative changes of state to be made during execution of a predicted instruction before the correctness of the prediction has been determined, while also providing for correcting the incorrectly changed state in a highly advantageous and expeditious manner if it is determined that the invention was mispredicted.

The specific nature of the invention as well as other objects, features, advantages and uses thereof will become evident from the following detailed description of a preferred embodiment in conjunction with the accompanying drawings.

BRIEF DESCRIPTION OF THE DRAWINGS

FIG. 4 graphical illustrates the accessing of microinstructions in response to microinstruction addresses.

FIG. 5 graphically illustrates an example of intermixed CISC and RISC instructions which may be provided in the system of FIG. 3.

DETAILED DESCRIPTION

Like numerals and characters refer to like elements throughout the figures of the drawings.

A preferred embodiment of the present invention will be described as applied to the multistage high speed microinstruction execution architecture disclosed in the aforementioned concurrently filed application Ser. No. 08/174,856. Accordingly, the disclosure in this application will initially be presented with reference to FIGS. 1–7.

Figure 1:
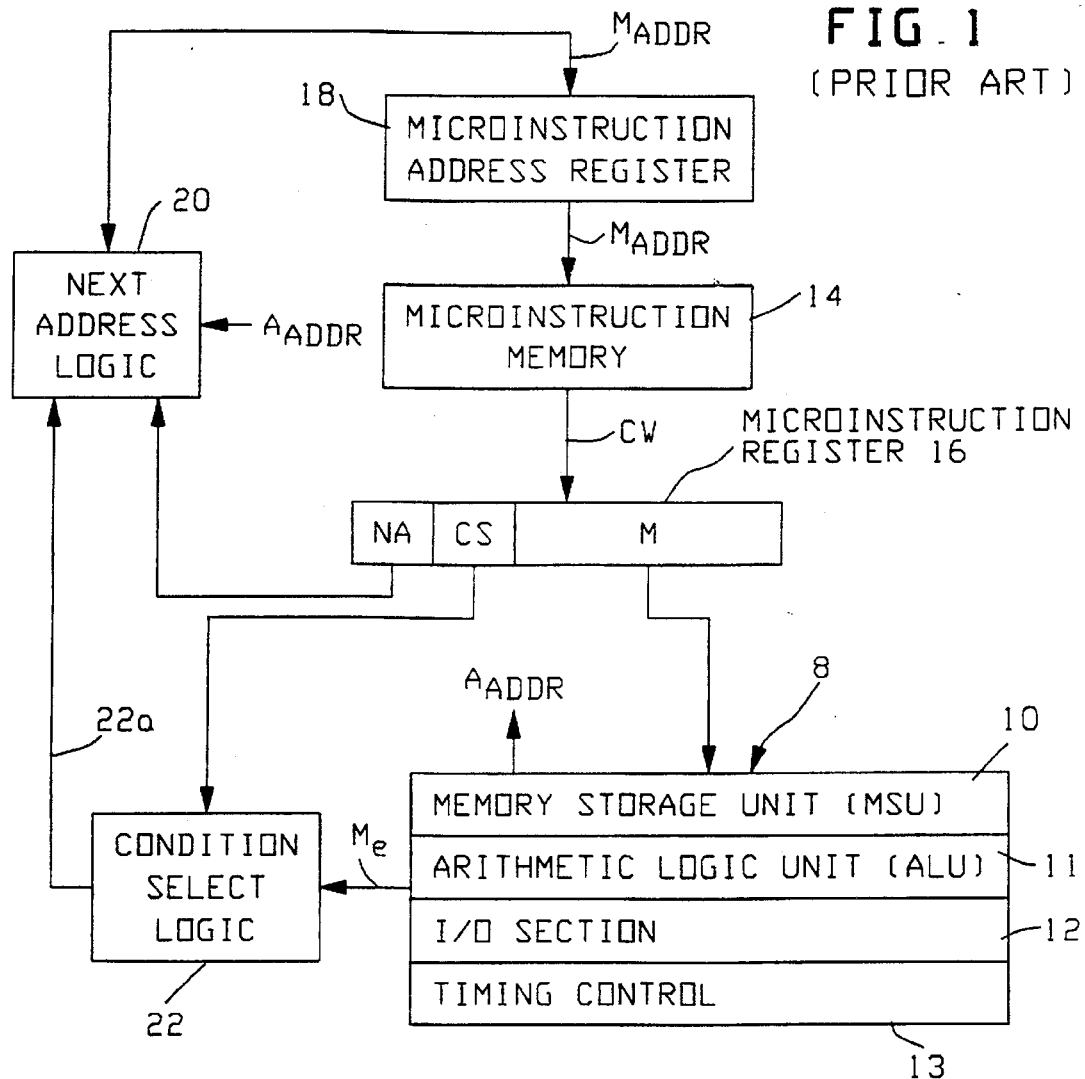
FIG. 1 is a block and schematic diagram of a prior art digital data processing system.

Reference is initially directed to FIG. 1 which generally illustrates a prior art digital data processing system. For the sake of simplicity, block 8 in FIG. 1 is provided to represent conventional portions of a digital data processing system including a memory storage unit (MSU) 10, an arithmetic logic unit (ALU) 11, an input/output (I/O) section 12, and a timing control 13, each of which are provided in any of a variety of forms well known in the art.

Typically, synchronous timing is provided for the system of FIG. 1 by the timing control 13 with one microinstruction being performed during each machine cycle. A machine cycle typically corresponds to a single clock time, with storage devices representative of machine state being updated by a clock occurring at the end of each cycle. In order not to confuse the drawings, the particular timing signals fed to the various components of the system in FIG. 1 are not shown, but should be assumed to be provided in a conventional manner.

Figure 2:
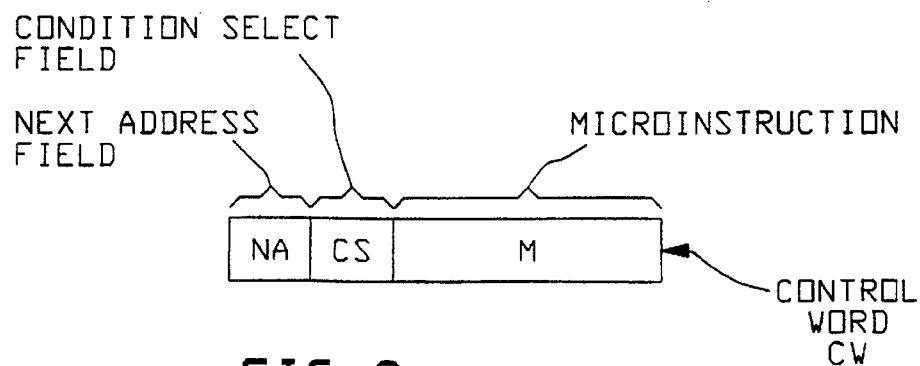
FIG. 2 illustrates the format of a control word used in the system of FIG. 1.

Continuing with the overall description of FIG. 1, it will be understood that a programmable microinstruction memory 14 is provided for storing a plurality of microinstruction control words CW. A typical control word CW is illustrated in FIG. 2 and will be seen to be comprised of a microinstruction M along with a next address field NA and a condition select field CS. A selected microinstruction control word CW is fetched from microinstruction memory 14 into a microinstruction register 16 in response to a microinstruction address $M_{addr}$ in microinstruction address register 18. The address $M_{addr}$ is provided during the previous cycle by next address logic 20 in response to selected condition signals 22a from condition select logic 22, next address field NA in microinstruction register 16, and alternate addresses $A_{addr}$ provided block 8. These alternate addresses $A_{addr}$ permit selection of other next microinstruction addresses, such as may be required for subroutine return or interrupt purposes. The selected condition signals 22a are selected by condition select logic 22 in response to condition select field CS in microinstruction register 16 and microinstruction results $M_e'$ from block 8.

During system operation in FIG. 1, the following overlapped (pipelined) executing and fetching operations occur during each machine cycle: (1) the system executes the microinstruction M portion of the control word CW stored in a microinstruction register 16 (this control word having been fetched from the microinstruction memory 14 and stored in the microinstruction register 16 during the previous cycle), and (2) in response to microinstruction address $M_{addr}$ in address register 18, the system fetches a next microinstruction control word CW from the microinstruction memory 14 and stores it in the microinstruction register 16 for use during the next cycle.

It will be understood with respect to the prior art system of FIG. 1 that, when a microinstruction is unconditional (i.e., there is only one next microinstruction), the fetching operation ((2) above) will always fetch the correct next microinstruction into microinstruction register 16. For such unconditional microinstructions, the pipelined microinstruction fetching and executing operations will be effective to increase the speed of microinstruction flow. However, if the microinstruction is conditional (i.e., there is more than one possible next microinstruction), a predicted next microinstruction address $M_{addr}$ is caused to be provided to address register 18 by block 8 in FIG. 1, which could result in fetching the wrong next microinstruction. In such case, steps have to be taken to correct the microinstruction flow.

Various ways are known for correcting for an incorrectly fetched microinstruction as described, for example, in the aforementioned U.S. Pat. Nos. 4,155,120 and 4,430,706. The disclosures of these patents are to be considered as incorporated herein. The approach taken by these disclosures is to test each predicted microinstruction to determine whether it was correctly predicted. If not, the incorrectly fetched microinstruction is aborted (i.e., prevented from causing any change in machine state), and provision is made for fetching the correct next microinstruction.

Figure 3:
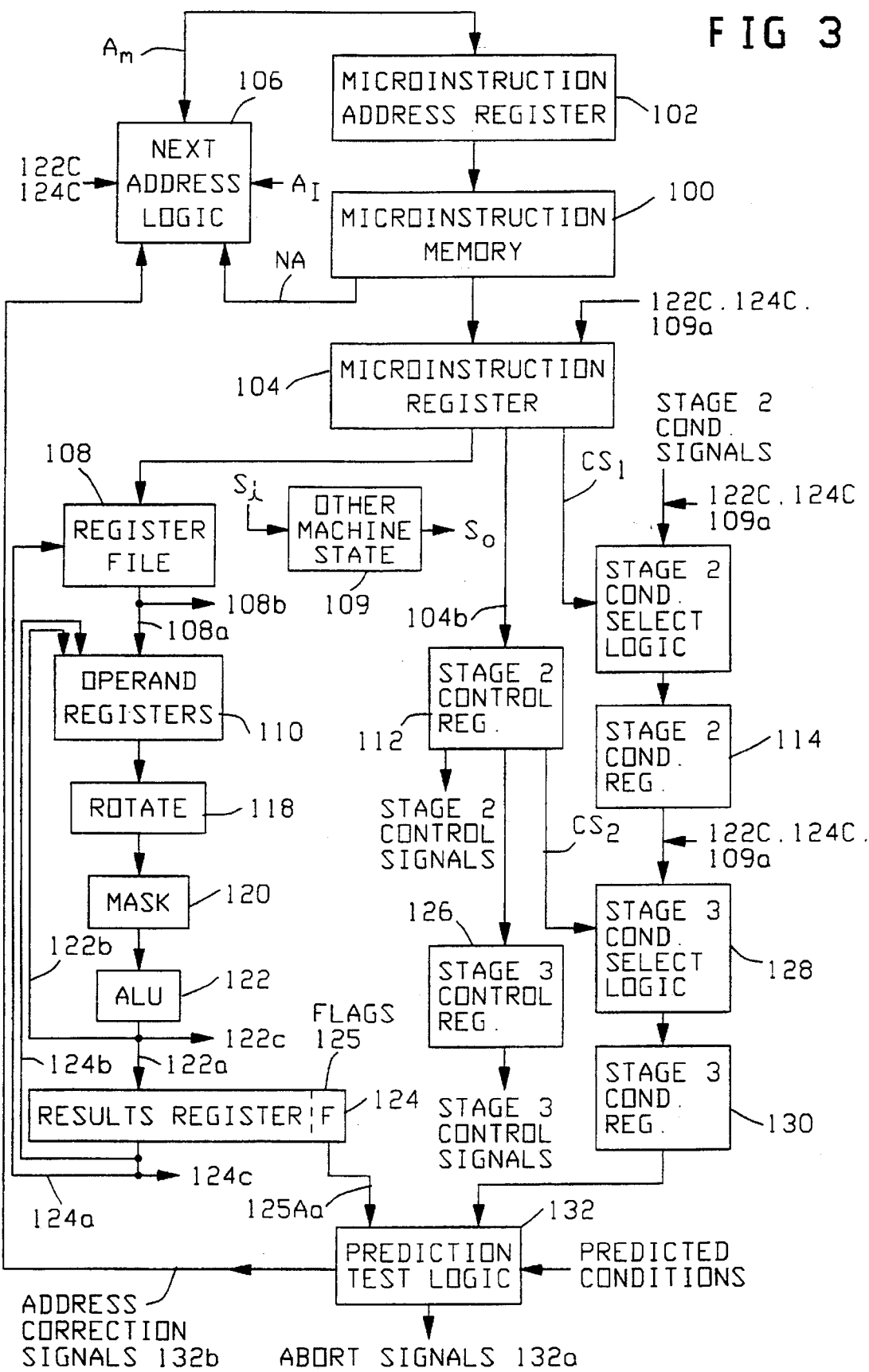
FIG. 3 is a block and schematic diagram illustrating the preferred embodiment disclosed in the aforementioned concurrently filed application.

A preferred embodiment of the multistage pipelined, microprogramming architecture disclosed in the aforementioned concurrently filed application is generally illustrated in FIG. 3. As shown in FIG. 3, the fetching and execution of microinstructions are performed in a pipelined manner using multiple stages. Registers 104, 110, 112, 114, 124, 126 and 130 provide for storage between stages. Although not required, it is of particular advantage to provide clocking for these multiple stages at a rate which is a multiple of the basic external clock rate, whereby throughput speed is increased accordingly. This multiple clock rate may, for example, be at the high rate typically employed in RISC systems. Such multistage high-speed pipelining as shown in FIG. 3 is referred to herein as super-pipelining.

Considering FIG. 3 more specifically, there are four stages which will be referred to as stage 0, stage 1, stage 2 and stage 3. Each stage requires only a single clock. In order not to overly complicate FIG. 3, clock signals are not illustrated, but should be assumed to be provided in a conventional manner.

It will be understood by reference to FIG. 3 that stage 0 involves reading out a microinstruction M from a microinstruction memory 100 into a microinstruction register 104 in response to a microinstruction address in microinstruction address register 102. Microinstruction memory 100 may, for example, be an on-chip instruction cache, such as disclosed in the commonly assigned copending patent applications Ser. Nos. 08/159,883 and 08/159,683 filed Nov. 30, 1993.

During stage 0 in FIG. 3, next address data NA is also read out from microinstruction memory 100 along with microinstruction M. This next address data NA is applied to next address logic 106 which provides a next microinstruction address $A_m$ to microinstruction address register 102 for selecting the next microinstruction to be used during the next clock cycle. Thus, when stage 0 completes, a microinstruction M will have been set up in microinstruction register 104 and the address of the next microinstruction will have been set up in microinstruction address register 102.

In the preferred embodiment being described, a static next microinstruction prediction approach is employed, but it is to be understood that dynamic prediction could also be employed. Accordingly, for each conditional microinstruction, the next microinstruction is known and is fetched in the same way as an unconditional instruction. For example, if static prediction is employed, the next instruction following a conditional instruction is predetermined by the compiler and embedded in the microcode. Fetching of a next microinstruction thus does not have to wait for testing of the microinstruction execution results from the current or any previously executed microinstruction. Instead, the predicted next microinstruction address $A_m$ is set up in microinstruction address register 102 during the same clock that a current microinstruction M is being read into microinstruction register 104. This operation is exemplified in FIG. 4, which is a graphical representation illustrating the manner in which successive next microinstruction addresses $A_m1$, $A_m2$, $A_m3$ in microinstruction address register 102 during respective clock periods 1, 2, 3 cause reading out of corresponding microinstructions M1, M2, M3 in the respective next following clock periods 2, 3, 4.

The predicted next microinstruction $A_m$ set up in microinstruction address register 102 during each clock is provided by next address logic 106 in response to NA read out from microinstruction memory 100. NA may itself be a microinstruction address, or may indicate that the next sequential (+1) microinstruction address should be used, or may indicate which of a plurality of input addresses $A_I$ should be used as the next microinstruction address $A_m$. These input addresses $A_I$ are provided for handling subroutine returns, jumps, interrupts, and also provide for ending a microinstruction (when its last microinstruction has been completed) and proceeding to the first microinstruction of the next macroinstruction. Next macroinstructions may also be statically predicted in the preferred embodiment, which is readily accomplished since the flow from one macroinstruction to the next is transparent at the microinstruction level regardless of the number of microinstructions in the macroinstruction.

FIG. 5 graphically illustrates an example of the intermixing of CISC and RISC microinstructions during clock periods 1–10. As shown in FIG. 5, microinstructions M1, M2, M3, M4 constitute a first CISC macroinstruction MCISC-1, the next following microinstructions M5, M6, M7, constitute three RISC macroinstructions MRISC-1, MRISC-2, MRISC-3, and the next three microinstructions M8, M9, M10 constitute a second CISC macroinstruction MCISC-2. The string of RISC macroinstructions MRISC-1, MRISE-2, MRISC-3 intermixed with CISC macroinstructions MCISC-1 and MCISC-2 permits advantage to be taken of RISC performance without giving up CISC advantages. For example, such strings of RISC instructions can be used to provide RISC operations for those portions of the microcode flow which will result in higher performance.

Having described how stage 0 provides for fetching a microinstruction into microinstruction register 104 and for setting up a next microinstruction address $A_m$ in microinstruction address register 102, operations during stage 1 will next be described with reference to FIG. 3. During stage 1, stage 1 control signals 104a derived from microinstruction register 104 cause selected operands to be accessed from a register file 108 and stored in operand registers 110.

The register file 108 stores the "state" of the virtual machine that is implemented through the hardware/microcode combination. For example, register file 108 stores various addresses (such as $A_f$ applied to next address logic 106), intermediate results, and other data required for system operation. The register file 108 may comprise an on-chip cache, such as disclosed in the aforementioned commonly assigned copending patent applications Ser. Nos. 08/159,883 and 08/159,683. Register file 108 may also interface with an off-chip main memory (not shown) for receiving data therefrom and for sending data thereto.

As illustrated in FIG. 3, the following control functions are also performed during stage 1: a) Stage 1 control signals 104b from microinstruction register 104 are transferred to a stage 2 control register 112 for use in controlling operations during stage 2; and b) Stage 1 condition select signals CSI from microinstruction register 104 are applied to stage 2 condition select logic 113 for selecting particular stage 1 condition signals to be transferred to a stage 2 conditions register 116, also for use in stage 2.

Having described how a microinstruction is accessed in stage 0, and how operands are selected in response thereto in stage 1, this description will now proceed to a consideration of stage 2 during which rotation, masking and arithmetic and logic operations are performed on these selected operands. More specifically, during stage 2, the selected operands in operand registers 110 are operated on by rotate logic 118, mask logic 120, and arithmetic and control logic 122 (ALU), which in turn are controlled by stage 2 control signals from stage 2 control register 112. The results of these operations during stage 2 are stored in a microinstruction results register 124. These results in register 124 include flags 125 which are used during stage 3 for determining whether the microinstruction fetched in stage 0 was correctly predicted, as will next be described. Similar to stage 3, stage 2 control signals from stage 2 control register 112 are transferred to a stage 3 control register 126 for use in controlling operations during stage 3; likewise, stage 2 control signals $CS_2$ from stage 2 control register 112 are applied to stage 2 condition select logic 128 to select particular conditions to be transferred to a stage 3 conditions register 130, also for use during stage 3.

Execution of a microinstruction is completed during stage 3. During stage 3, the results stored in microinstruction results register 24 in FIG. 3 are written into register file 108. Also, during stage 3, prediction test logic 132 determines whether the microinstruction was properly predicted. This is accomplished by applying flag outputs 125a to prediction test logic 132 along with conditions 130a from stage 3 condition register 130, predicted conditions 131 derived from register file 108, and/or outputs from various logic operations being concurrently performed, including those occurring in other stages. Based on these inputs, prediction test logic 132 determines whether a microinstruction was wrongly predicted and, if so, produces abort signals 132a. These abort signals 132a initiate the following operations: a) abort signals 132a are applied to register file 108 and other storage and logic to prevent the mispredicted microinstruction from improperly changing system state and/or other system storage: b) abort signals 132a cause the pipeline to be emptied by invalidating the effect of microinstructions fetched following the mispredicted microinstruction. Accordingly, abort signals are used to invalidate the data in address, operand and result registers 102, 110 and 124, in microinstruction and control registers 104, 112 and 126, and in condition registers 116 and 130. This invalidating in response to abort signals 132a may, for example, be accomplished as disclosed in the aforementioned U.S. Pat. Nos. 4,155,120 and 4,430,706 and in the aforementioned patent applications Ser. Nos. 08/159,883 and 08/159,683. A preferred manner is to include a validity bit in each involved register, which is settable by the abort signals 132a to indicate that the data in the register is invalid. In order not to confuse FIG. 3, the connections of the abort signals 130a to the various registers are not shown, but may be readily provided by those skilled in the art.

Stage 3 also provides for fetching the correct microinstruction when prediction test logic 130 determines that a microinstruction was mispredicted. This is accomplished by applying signals 302b from prediction test logic 132 to next address logic 106 in FIG. 3, which causes next address logic 106 to set up the correct microinstruction address (corresponding to the correct microinstruction which should have been fetched) in microinstruction address register 102. Operations then proceed as previously described for stages 0, 1, 2 and 3 in connection with FIG. 3. Since discovery of the mispredicted instruction caused the pipeline to be emptied, operations in invalidated stages will be ignored.

It will be understood that emptying of the pipeline as a result of a mispredicted conditional microinstruction, as described above, can severely affect performance, if it occurs too often, particularly where a multistage architecture is employed having a deep pipeline. However, it has been discovered that conditional branches can be predicted with high accuracy at the microinstruction level, even with static prediction, so that the overall performance of the multistage super-pipelined architecture illustrated in FIG. 3 is able to provide a very significant performance improvement.

The above described multistage super-pipelined architecture offers further advantages. For example, note in FIG. 3, that additional output signals 122b and 122c are provided from ALU 122, and additional output signals 124b and 124c are provided from results register 124. These output signals may advantageously be applied to logic and storage in other stages to enhance performance. For example, note that outputs 122b and 124b from ALU 122 and results register 124, respectively, are applied as inputs to the operand registers 110. Also, outputs 122c and 124c from ALU 122 and results register 124, respectively, may be provided for use as inputs to microinstruction register 104, control registers 112 and 126, and condition select logic 114 and 128 for affecting the operation thereof in their respective stages. Such interconnections between stages made possible by the pipelined multistage architecture provides greater versatility and flexibility in enhancing operations in each stage, and thus enhances overall microinstruction execution. Another significant advantage is that logical operations which cannot be performed in one clock can be partially performed in a first stage and then completed in the next stage.

Furthermore, since multiple stages are available for performing logic related to determining whether a conditional microinstruction was correctly predicted, the correctness of the prediction can be determined in stage 3 without requiring an additional delay for logic testing operations.

Figures 6, 7:
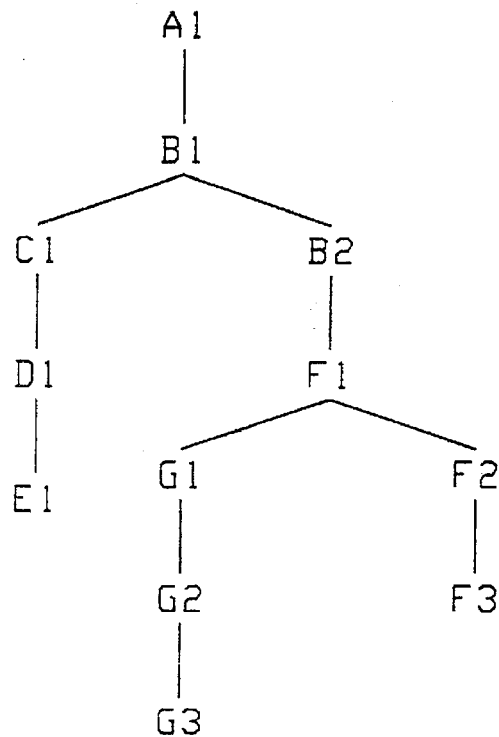
FIG. 6 illustrates a typical microinstruction stream which may be applied to the system of FIG. 3.
FIG. 7 is a table illustrating microinstruction flow in the system of FIG. 3 for the microinstruction stream of FIG. 6.

Reference is next directed to FIGS. 6 and 7 which will be used to illustrate typical operation of the multistage superpipelined architecture in FIG. 3.

FIG. 6 is an example of a typical microinstruction stream, wherein microinstructions B1 and F1 are conditional, and wherein it is predicted that B2 follows B1 and F2 follows F1.

The table in FIG. 7 illustrates microinstruction flow through stages 0, 1, 2 and 3 for ten clocks periods based on the microcode flow of FIG. 6, wherein the prediction of flow from B1 to B2 is found to be incorrect, while the prediction of flow from F1 to F2 is found to be correct. It is to be understood that a clock period in FIG. 8 preferably corresponds to a single clock time with storage devices representative of machine state being updated at the end of each clock, period.

It will be remembered with reference to FIGS. 3 and 4 that: during stage 0, a microinstruction is fetched and stored in microinstruction register 104; during stage 1, operands for the fetched microinstruction are selected and stored in microinstruction operand registers 110; during stage 2, rotate, mask and ALU operations are performed on the selected operands and the results (and flags) stored in results register 124; and, during stage 3, the results are written into register file 108 and the correctness of a predicted microinstruction is tested. If it is determined during stage 3 that an incorrect microinstruction was fetched, the microinstruction is aborted, the pipeline is emptied, and the address of the correct microinstruction is set up in address register 102.

Initially, clock periods 1–4 in FIG. 7, which do not involve abortion, will be considered in more detailed As shown in FIG. 7, during clock periods 1–4, stage 0 fetches respective microinstructions A1, B1, C1 and D1; during clock periods 2–4, stage 1 selects operands for respective microinstructions A1, B1 and C1; during clock periods 3–4, stage 2 performs mask, rotate and ALU operations for respective microinstructions A1 and B1; and during clock period 4, stage 3 performs result storage and next microinstruction address selection for microinstruction A1. Since no incorrect prediction is discovered during clock periods 1–4, no abortion occurs.

During clock period 5, stages 0, 1, 2 and 3 perform their respective operations on microinstructions E1, D1, C1 and B1, as indicated in FIG. 7. However, during stage 3 of clock 5, the prediction test logic 130 will determine that the microinstruction C1 was incorrectly predicted, and that microinstruction B2 should have been fetched instead. As a result, an abortion occurs (as previously described), which prevents writing in register file 108, empties the pipeline by invalidating the data in registers 104, 110, 112, 116, 124, 126 and 130, and causes the correct microinstruction address (i.e., the address of B2) to be set up in microinstruction address register 102.

Thus, as illustrated for clock period 6 in FIG. 7, during stage 0 of clock period 6, the correct microinstruction B2 is fetched into microinstruction register 104. Note that an "X" is marked in stages 1, 2 and 3 of clock period 6 to indicate that operations of these invalidated (emptied) stages are ignored during clock period 6.

During clock period 7 in FIG. 7, microinstruction F1 is fetched during stage 0, and operands are selected for microinstruction B2 during stage 1, as shown. Stages 2 and 3 continue to be ignored during clock 7 (as indicated by the "X" provided for these stages in clock 7), since valid data corresponding to the correct microinstruction B2 has not yet propagated thereto.

In clock period 8 in FIG. 7, microinstruction G1 is fetched in stage 0. Note in FIG. 6 that F1 is a conditional microinstruction, in which case microinstruction G1 is fetched based on the assumed prediction. Also, during clock 8, operands are selected for microinstruction F1 in stage 1, and mask, rotation and ALU operations are performed for microinstruction B2 in stage 2. Stage 3 of clock 8 is again marked with an "X" since valid data still has not propagated thereto.

In clock period 9, the pipeline is again filled, since all four stages 0, 1, 2 and 3 are now valid. In clock period 9, the next microinstruction G2 is fetched during stage 0, operands are selected for microinstruction F1 during stage 2, and execution is completed for microinstruction B2 in stage 3.

In clock period 10, which is the last clock period illustrated in FIG. 7, the next microinstruction G3 is fetched during stage 0, operands are selected for microinstruction G2 in stage 1, rotate, mask and ALU operations are performed for microinstruction G1 in stage 2, and microinstruction completion operations are performed for microinstruction F1 in stage 3. Since microinstruction F1 is conditional, as shown in FIG. 6, stage 3 also determines whether the selection of the predicted microinstruction G1 was correct. Since the prediction will be found to be correct, as assumed for this example, no abortion occurs and the flow continues without interruption.

Having described with reference to FIGS. 1–7 the microinstruction execution architecture disclosed in the aforementioned concurrently filed patent application Ser. No. 08/174/ 856, a preferred manner for incorporating the present invention therein will next be described with reference to FIGS. 8–11 First, however, it will be helpful in understanding the present invention to consider some of the reasons as to why performance can be degraded when state changes are delayed until it is determined that an instruction has been correctly predicted.

It will be understood that several data hazards exist when employing pipelined instruction execution architectures that allow concurrent or out-of-order execution, as is typical in present day systems. As is well known, a data hazard refers to a situation where it is possible to read or write incorrect data, usually due to overlapping instruction executions. One example of a data hazard is a read-after-write (RAW) hazard, where an instruction "writes" data that a subsequent instruction must "read", in which case the "write" must be performed before the "read" is allowed to occur. Another example of a data hazard is a write-after-read (WAR) hazard, where an instruction "reads" data that a subsequent instruction must "write", in which case the "write" must occur after the "read". An additional example of a data hazard is a write-after-write (WAW) hazard, where an instruction writes data that a subsequent instruction must also write, in which case the "writes" must occur in the proper order.

Pipelined architectures typically solve data hazards, such as exemplified above, by forcing instructions to write their respective results (changing machine state) in a predetermined order. Such forcing of instruction writing can cause significant delays in the speed of instruction execution, particularly for pipelined machines employing branch prediction, since further delays are introduced by having to delay the writing of results until it is determined that an instruction was correctly predicted.

Figure 8:
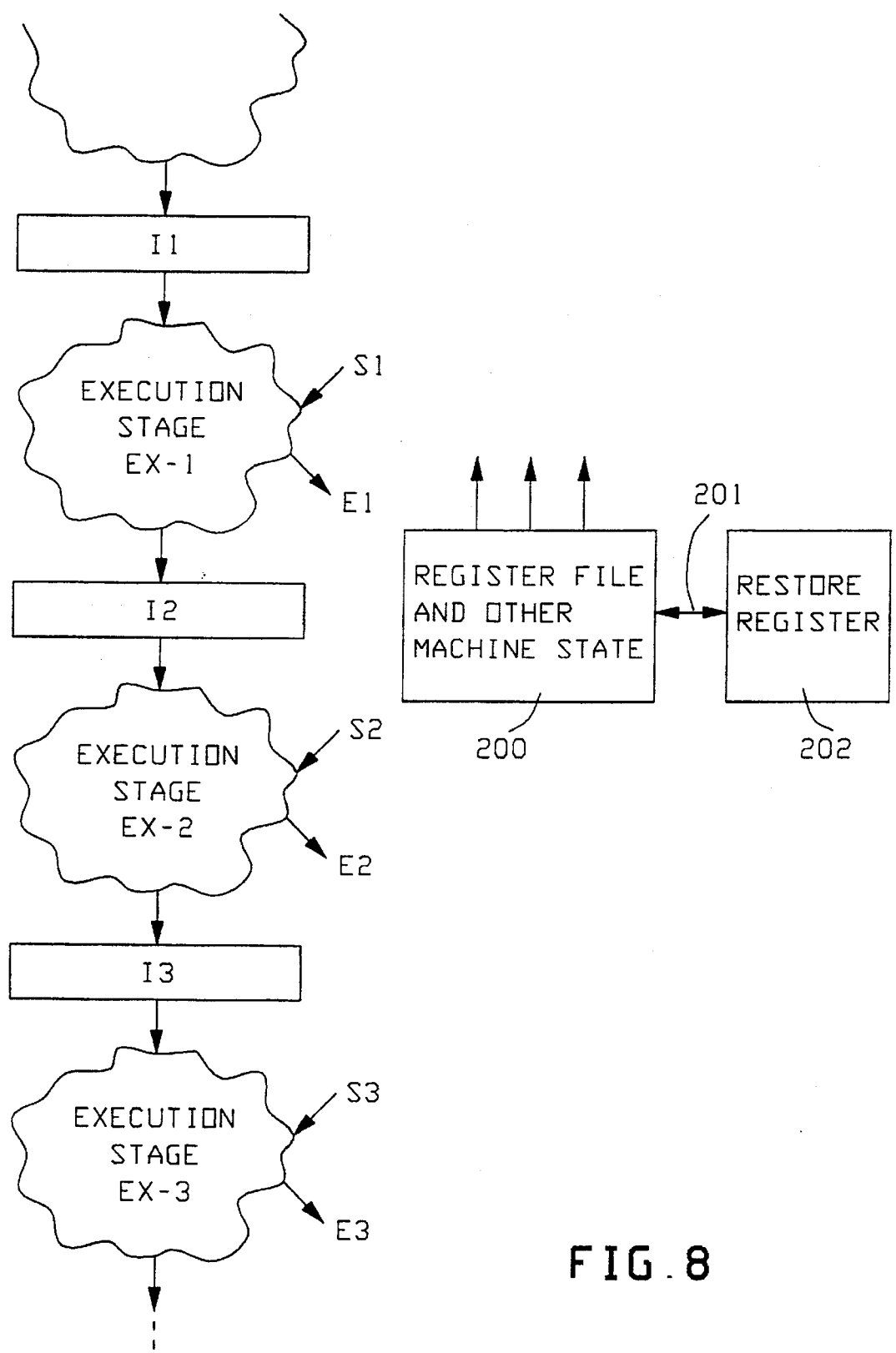
FIG. 8 is a block and schematic diagram broadly illustrating a preferred embodiment of a digital data processing system employing speculative state changing in accordance with the invention.

FIG. 8 is a block and schematic diagram broadly illustrating a preferred embodiment employing speculative state changing in accordance with the invention.

It is to be understood with respect to FIG. 8 that a microinstruction architecture similar to that described in FIG. 3 is preferably employed. More specifically, FIG. 8 shows three stages of a pipelined multistage architecture employing intermediate registers I1, I2 and I3 which receive instruction execution results from execution stages EX-1, EX-2 and EX-3, respectively. Intermediate registers I1, I2 and I3 may, for example, correspond to registers 104, 110 and 124 in FIG. 3 respectively, while execution stages EX-1, EX-2 and EX-3 may correspond to stages 1, 2 and 3 in FIG. 3. Machine state block 200 shown in FIG. 8 corresponds to both the register file 108 and the other machine state 109 in FIG. 3. Also, for greater clarity, various portions of FIG. 3 are omitted from FIG. 8, but may be provided in the same manner as shown in FIG. 3.

Execution results applied to machine state 200 in FIG. 8 from execution stages EX-1, EX-2 and EX-3 are indicated as E1, E2, and E3, respectively, while the particular machine state values applied to stages EX-1, EX-2 and EX-3 for use thereby are indicated as S1, S2 and S3, respectively.

As shown in FIG. 8, restore registers 202 communicate with machine state 200 via lines 201. These restore registers 202 are provided to store backup copies of machine state in order to permit machine state 200 to be changed in response to instruction execution in a stage, even though it has not yet been determined whether the instruction which produced the change correctly predicted. This is accomplished by allowing early state changes to be made in one or more state values, while storing backup copies (via lines 201) of the original state values in corresponding restore registers 202. Accordingly, if at a later time it is determined that the instruction which caused the state changes was mispredicted, the backup copies in the corresponding restore registers are applied (via lines 201) to machine state 200 to restore the incorrectly changed state values to their original (correct) values.

Since the pipelined architecture of FIG. 8 permits state values to be changed without having to wait until it is determined that the corresponding instruction has been correctly predicted, a significantly higher speed of instruction execution can be achieved. For example, for instructions that can complete quickly and for which instruction execution can be speeded up by changing state as early as possible, allowing early changes of state as described above can significantly improve performance. Since it is desirable to limit the number of restore registers 202 provided, backup should be provided primarily for those state changes which will produce the greatest improvement in performance.

Figure 9:
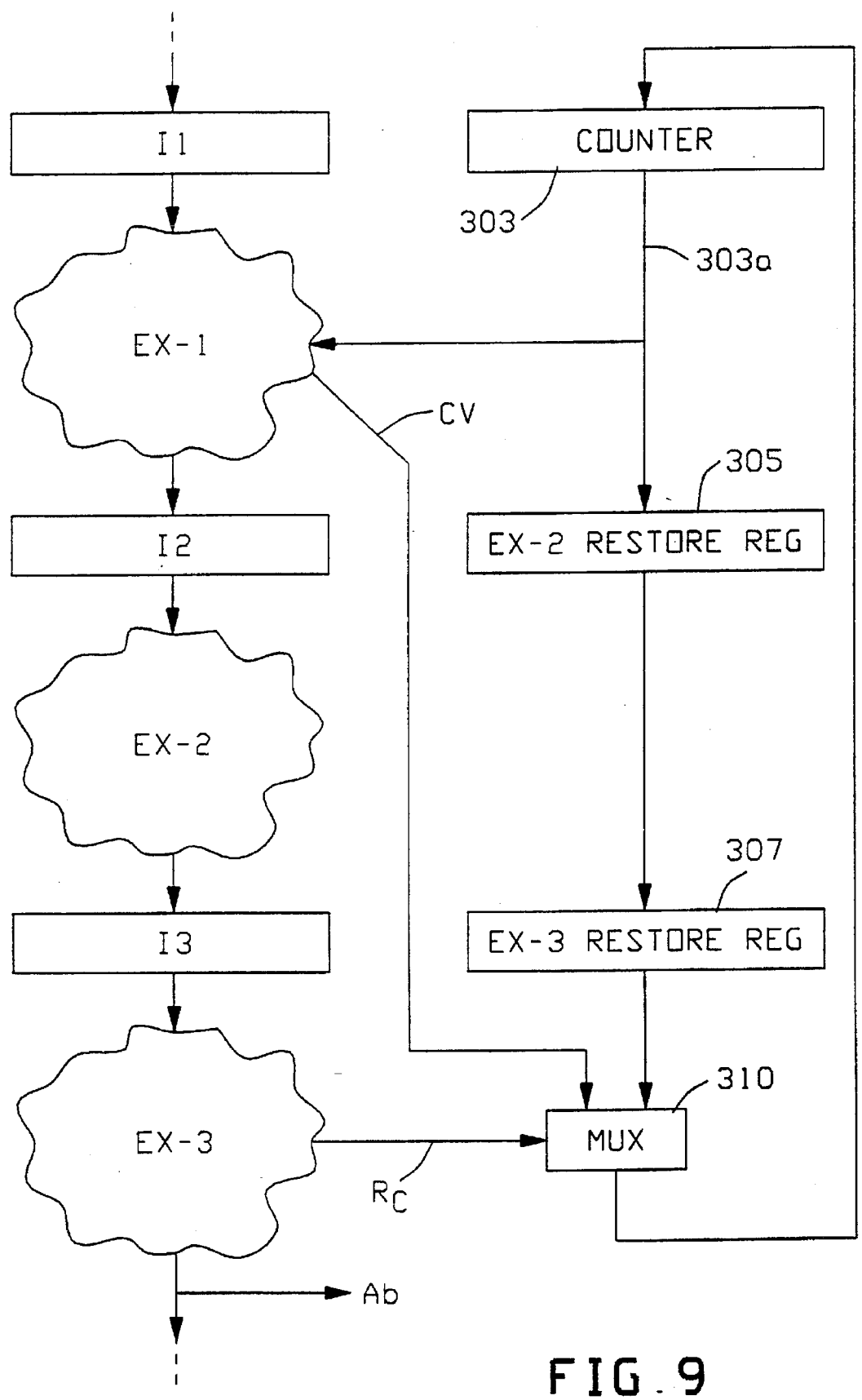
FIG. 9 is a block and schematic diagram more specifically illustrating the system of FIG. 8.
Figures 10, 11:
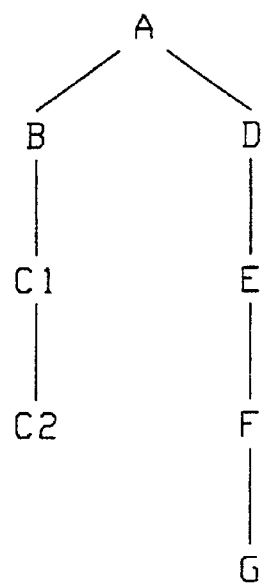
FIG. 10 illustrates a typical microinstruction stream which may be applied to the system of FIG. 9.
FIG. 11 is a table illustrating microinstruction flow in the system of FIG. 10 for the microinstruction stream of FIG. 10.

Reference is next directed to FIGS. 9–11 which will be used for illustrating a specific example of the operation of the speculative state changing architecture shown in FIG. 8.

FIG. 9 is basically similar to FIG. 8, with counter 303 in FIG. 8 being representative of a state value in block 200 for which speculative state changing can advantageously be provided. Similarly, EX-2 and EX-3 restore registers 305 and 307 in FIG. 9 are representative of restore registers 202 in FIG. 8 which in FIG. 9 are used for providing backup of counter 303. Execution blocks EX-1, EX-2 and EX-3 and intermediate registers I1, I2 and I3 in FIG. 10 are as previously described in connection with FIG. 8.

For the purposes of this operative example being described, it will be assumed that the microinstruction flow of FIG. 10 is presented, wherein A is a conditional microinstruction and has two possible next microinstructions, microinstruction B or D. Also, it will be assumed that each of microinstructions A, B, D and F in FIG. 10 increment counter 303 in FIG. 9 during stage EX-1, and that counter 303 is not otherwise incremented. This is indicated in FIG. 9 by stage EX-1 applying a new counter value CV to counter 303 via multiplexor 310 which is what normally occurs when no misprediction is detected during EX-3, as will hereinafter be explained. When CV increments counter 303 during stage EX-1, a backup copy of the original (unchanged) count value is stored in EX-2 restore register 305. Note that the counter output 303a is also applied to execution block EX-1 for use thereby during each clock period. Also note, as shown in FIG. 9, that EX-2 restore register 305 transfers its backup value to EX-3 restore register 307 at the end of each microinstruction, so as to permit its use in stage EX-3 when its respective microinstruction is executed thereby.

Execution block EX-3 in FIG. 9, similar to stage 3 in FIG. 2, determines whether a microinstruction was mispredicted. If so, EX-3 provides appropriate outputs Ab for performing abort operations, as previously described for stage 3 in FIG. 3. In addition, when a misprediction is detected, EX-3 in FIG. 9 provides a restore counter output Rc which is applied to multiplexer 310 for selecting the count value in EX-3 restore register 307 to be applied to counter 303 instead of the counter value CV from EX-1. This, in effect, restores counter 303 to the value that it had prior to being changed during EX-1 by the microinstruction which was found to have been mispredicted. If EX-3 determines that the microinstruction was correctly predicted, counter 303 is not restored but is set in the usual manner in accordance with the new counter value CV provided by EX-1.

Next to be described with additional reference to FIG. 11, is the specific manner in which the exemplary microinstruction flow shown in FIG. 10 propagates through the speculative execution architecture of FIG. 10 during clock periods 1–7. It will be assumed for this example that microinstruction B is predicted to follow conditional microinstruction A, but that this is a misprediction, since microinstruction A should have been followed by microinstruction D. It will additionally be assumed that counter 303 initially has a "1" count value.

Note that FIG. 11 indicates which microinstruction is being operated on by each of stages EX-1, EX-2 and EX-3 during each of the illustrated clock periods 1–7. As in FIG. 8, a clock period in FIG. 12 preferably corresponds to a single clock time with storage devices representative of machine state being updated at the end of each clock period. FIG. 11 also indicates the values of counter 303 and counter restore registers 305 and 307 during each clock period. Operation during each clock will now be considered in more detail.

During clock period 1 in FIG. 11, microinstruction A is operated on by stage EX-1, as shown. Also, counter 303 will be seen to have the assumed initial count value of "1". Activities which are not pertinent during clock period 1 are indicated by a "?".

During clock period 2 in FIG. 11, microinstruction A has propagated to stage EX-2, and the predicted next microinstruction B is in stage EX-1. Also, during clock period 2, counter 303 has a "2" count value as a result of having received an incremented CV value of "2" from stage EX-1 operated on microinstruction A during clock period 1. Also, EX-1 counter restore register 30 has a "1" value during clock period 2 as a result of the original "1" value of counter 303 having been stored therein during clock period 1 to provide a backup copy.

As shown for clock period 3 in FIG. 11, microinstruction C1 is in stage EX-1, microinstruction B is in stage EX-2, and microinstruction A is in stage EX-3. Since it is assumed that the CV value provided by EX-1 during microinstruction B (like microinstruction A) causes counter 303 to be incremented during EX-1, counter 303 will have a "3" count value during clock period 3, while EX-2 restore register 305 will have a "2" value corresponding to the prior "2" count value of counter 303. Also, the EX-2 counter 307 has a "1" value during clock period 3 as a result of the previous "1" count in counter restore register 303 having been transferred thereto during clock period 2, as indicated in FIG. 10.

Since microinstruction A is in stage EX-3 during clock period 3, the correctness of the predicted branch from microinstruction A to microinstruction B will be tested. As mentioned previously, for the example being presented, it is assumed that stage EX-3 will determine that microinstruction B was incorrectly predicted, and that microinstruction D should have followed microinstruction A.

As a result of determining during clock period 3 that microinstruction B was mispredicted, during clock period 4 the correct microinstruction D is caused to be applied to stage EX-1 (as described for example in connection with stage 3 of FIG. 3), while the other stages EX-2 and EX-3 as well as the EX-2 and EX-3 restore registers 305 and 307 are invalidated, as indicated by "X". Note that, during clock period 4, counter 303 will have been restored to its original "1" value (i.e., the value it had prior to execution of microinstruction B in clock period 1) which restoration occurs as a result of restore output Rc from EX-3 during clock period 3 causing multiplexor 310 to select the original "1" count value in EX-3 counter restore register 307 for application to counter 303.

As shown in FIG. 11, during the next following clocks 5–7 in FIG. 11, operations on the corrected microinstruction flow D, E, F, etc. proceed as shown in FIG. 11, with counter 303 and EX-2 and EX-3 restore registers 305 and 307 providing backup copies for counter 303, as previously described. The resulting completed microinstruction flow for clocks 1–7 is A, D, E, as illustrated by the stage EX-3 line in FIG. 11.

It is to be understood that the present invention is not limited to the preferred embodiment of the invention described herein, since many variations in construction arrangement, use and operation are possible within the scope of the invention.

Accordingly, the present invention is to be considered as encompassing all modifications, variations and adaptations coming within the scope of the invention as defined by the appended claims.

What is claimed is:

1. In a data processing system, the combination comprising:

An addressable memory for storing instructions, at least particular ones of said instruction in said memory being conditional instructions having a plurality of possible next instructions;

addressing means for selectively addressing said memory for reading out a selected instruction therefrom;

storage means for storing execution results and other machine state; and executing means for executing an instruction read out from said memory and for changing said storage means in response thereto;

said executing means including multiple stages operating in a pipelined manner on instructions read out from said memory, wherein instructions by at least one of said stages provides a next instruction address for said addressing means which is a predicted next instruction for a conditional microinstruction;

said executing means providing for detecting and correcting an incorrect instruction prediction in the last of said multiple stages;

said executing means providing for said storage means to be speculatively changed during execution of a conditional instruction before detection of the correctness thereof by propagating a speculative change to next following stages;

said executing means including a restore storage means in each stage for storing a backup copy of changed machine state for use in said last stage for restoring machine state when said executing means detects an incorrect instruction prediction.

2. The invention in accordance with claim 1, wherein said addressable memory includes both CISC and RISC instructions, a CISC instruction comprising a plurality of microinstructions and a RISC instruction comprising a single microinstruction.

3. The invention in accordance with claim 2, wherein said data processing system provides for handling microinstruction a an identical manner regardless of whether the microinstruction is a RISC microinstruction or one of a plurality of CISC microinstructions.

4. The invention is accordance with claim 1, wherein said executing means provides for transmitting outputs from said register storage means to different stages for use thereby during execution.

5. The invention in accordance with claim 4, wherein said executing means operates in response to detecting an incorrect instruction prediction to prevent writing in said register storage means.

6. The invention is accordance with claim 5, wherein said executing means additionally operates in response to detecting an incorrect instruction prediction to empty the pipeline by invalidating data currently stored in said register storage means.

7. The invention in accordance with claim 1 wherein each stage executes in a single clock cycle.

* * * * *